United States Patent [19]
Yutaka

[11] Patent Number: 5,619,629
[45] Date of Patent: Apr. 8, 1997

[54] DRAWING DATA PRODUCING APPARATUS AND DRAWING DATA PRODUCING METHOD

[75] Inventor: Teiji Yutaka, Kanagawa, Japan

[73] Assignee: Sony Corporation, Tokyo, Japan

[21] Appl. No.: 320,272

[22] Filed: Oct. 11, 1994

[30] Foreign Application Priority Data

Oct. 15, 1993 [JP] Japan .................................... 5-258625

[51] Int. Cl.⁶ .................................................... G06F 15/00
[52] U.S. Cl. ............................................................ 395/133
[58] Field of Search ..................................... 395/120, 121, 395/122, 133; 345/113, 114, 118, 119, 120

[56] References Cited

U.S. PATENT DOCUMENTS 4,825,391  4/1989  Merz ........................................ 395/131

OTHER PUBLICATIONS

IEEE Pacific Rim Conference on Communications, Computers and Signal Processing, 9–10 May 1991 New York US, pp. 607–610, XP 000280373 Shepard and Laporte 'Real–Time Hidden Surface Removal in a Flight Simulator'.

Computer Aided Design, vol. 23, No. 10, Dec. 1991 London GB, pp. 684–691, XP 000247375 Karakas 'Hidden–Line Algorithm Based on Range Searching'.

*Primary Examiner*—Phu K. Nguyen
*Attorney, Agent, or Firm*—William S. Frommer; Alvin Sinderbrand

[57] ABSTRACT

A drawing data producing apparatus having a plurality of sequence tables into which sequence data indicating processing sequences of a plurality of blocks obtained by dividing a picture are written every objects constituting the picture with information in a Z-direction in three dimensional coordinates of representative pixels of the respective blocks being as addresses; and a sorting control section for carrying out, in a stepwise manner, Z-sorting of a plurality of sequence tables therebetween, to produce drawing data by stepwise Z-sorting of a plurality of sequence tables therebetween. Thus, even in the case where objects physically divided are present at depths close to each other, this drawing data producing apparatus excludes interference of polygon unit, thus making it possible to produce drawing data of excellent picture quality.

7 Claims, 9 Drawing Sheets

| ADDRESS | 0 | 1 | 2 | 3 | 4 | 5 | | 50 | 51 | 52 | 53 | 54 | 55 | 56 | 57 | 58 | 59 | 60 | 61 | 62 | 63 | 64 | 65 |
|---|---|---|---|---|---|---|---|---|---|---|---|---|---|---|---|---|---|---|---|---|---|---|---|---|
| | 1 | 2 | 3 | 4 | 5 | | | 51 | 52 | 53 | 54 | 55 | 56 | 57 | 58 | 20 | 60 | 61 | 62 | 63 | 64 | 65 | 13 |

FIG.9

| OFFSET | ADDRESS | | | | | | | | | | | | | | | | |
|---|---|---|---|---|---|---|---|---|---|---|---|---|---|---|---|---|---|
| 50 | 50 | 51 | 52 | 53 | 54 | 55 | 56 | 57 | 58 | 59 | 60 | 61 | 62 | 63 | 64 | 65 |
| | 51 | 52 | 53 | 54 | 55 | 56 | 57 | 58 | 20 | 60 | 61 | 62 | 63 | 64 | 65 | 13 |

FIG.10

DRAWING DATA PRODUCING APPARATUS AND DRAWING DATA PRODUCING METHOD

BACKGROUND OF THE INVENTION

1. Field of the Invention

This invention relates to a drawing data producing apparatus and a drawing data producing method for carrying out so called Z-sorting (sorting in Z (depth) direction) by using one or more sequence tables to produce drawing (painting) data, and is applied to, e.g., a three-dimensional picture display in computer graphics.

2. Description of the Related Art

In a three-dimensional picture display in computer graphics, since it is necessary to produce (prepare) drawing (painting) data so as not to display the portion invisible from the observer's eye, e.g., an original picture is divided into a plurality of blocks to prepare pointers indicating processing sequences for every block from information in the Z (depth) direction in three-dimensional coordinates of respective blocks to write them into a buffer memory, and to register their headers into a table to carry out processing in a block unit in accordance with a sequence designated by the header and the pointer.

An original picture is divided into (64×96) blocks as, e.g., unit block of (8×8) pixels. Coordinate positions are determined in the in Z-direction in three dimensional coordinates every representative pixels of respective blocks to allow the depth to be in the range of O–D to register, as header (start address), block No. (n, m) of the first block having representative pixel of depth d into a table having depth z as address. A series of block numbers starting from the header (start address) are written into a memory as pointer to prepare sequence tables prescribing processing sequences from shallow portion toward deep portion in block units to produce drawing data by Z-sorting using these sequence tables.

Figure 10:
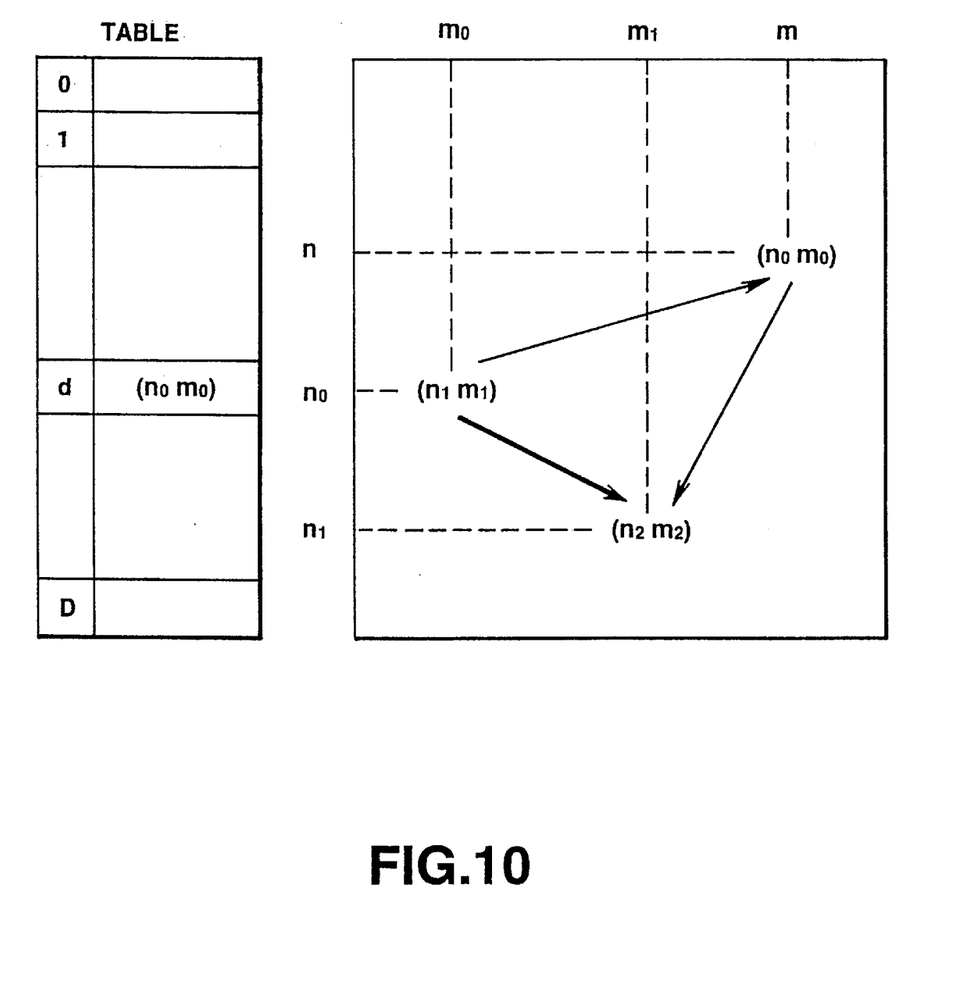
FIG. 10 is a view showing, in a model form, structure of sequence table in a conventional drawing data producing apparatus.

Namely, in the case where depth of the representative pixel of a block of block No. (n, m) is d, if any address data is not written in d address of a table, the block number (n, m) is written into the d address of the table as start address. On the other hand, when start address ($n_0$, $m_0$) is already written in the d address as shown in FIG. 10, pointer value ($n_1$, $m_1$) of ($n_0$, $m_0$) address of memory is written into (n, m) address of the memory, and pointer value (n, m) is written into ($n_0$, $m_0$) address. By repeating such procedure, a series of block numbers starting from the header (start address) of the table are written into memory as a pointer, thus to prepare sequence tables prescribing processing sequences from shallow portion toward deep portion in block units. Then, drawing data is produced (prepared) by Z-sorting using these sequence tables.

Meanwhile, in conventional drawing data producing apparatus adapted for producing drawing data by Z-sorting using sequence table, in the case where two objects physically divided exist at depths z close to each other, it was disadvantageously unable to exclude interference of polygon unit. In addition, sequence tables corresponding to the range of stages of depth are required. Improvement in accuracy of sequence table resulted in the problem that a memory of a large capacity is required.

OBJECTS AND SUMMARY OF THE INVENTION

In view of problems of prior arts as described above, a first object of this invention is to provide a drawing data producing apparatus such that even in the case where two objects physically divided exist at depths close to each other, interference of polygon unit is excluded, thus making it possible to produce drawing data of excellent picture quality.

A second object of this invention is to provide a drawing data producing apparatus adapted for carrying out, in a stepwise manner, Z-sorting of a plurality of sequence tables therebetween by simple construction, thus making it possible to securely and speedily produce drawing data of excellent picture quality.

A third object of this invention is to provide a drawing data producing apparatus adapted for compressing volume (capacity) of sequence table, thus making it possible to suppress increase in memory capacity resulting from provision of a plurality of sequence tables.

A fourth object of this invention is to provide a drawing data producing method in which even in the case where two objects physically divided exist at depths close to each other, interference of polygon unit is excluded, thus making it possible to produce drawing data of excellent picture quality.

A fifth object of this invention is to provide a drawing data producing method capable of securely carrying out, in a stepwise manner, Z-sorting of a plurality of sequence tables therebetween.

A sixth object of this invention is to provide a drawing data producing method capable of simplifying control of stepwise Z-sorting of a plurality of sequence tables therebetween.

A seventh object of this invention is to provide a drawing data producing method capable of suppressing increase in memory capacity resulting from provision of a plurality of sequence tables.

To achieve the above-mentioned objects, in accordance with this invention, there is provided a drawing data producing apparatus comprising: a plurality of sequence tables into which sequence data indicating processing sequences of a plurality of blocks obtained by dividing a picture are written every objects constituting the picture with information in Z-direction in three-dimensional coordinates of representative pixels of the respective blocks being as addresses; and sorting control means for carrying out Z-sorting of sequence tables therebetween in a stepwise manner, thus to produce drawing data by stepwise Z-sorting of the plurality of sequence tables therebetween.

In the above-mentioned drawing data producing apparatus, sorting control means may be comprised of a DMA controller.

Further, in accordance with this invention, there is provided a drawing data producing method comprising the steps of allocating sequence data indicating processing sequences of a plurality of blocks obtained by dividing a picture, every objects constituting the picture, to a plurality of sequence tables having, addresses, information in Z-direction in three-dimensional coordinates of representative pixels of the respective blocks to write them thereinto to carry out Z-sorting of the sequence tables therebetween in a stepwise manner to produce drawing data.

In the above-mentioned drawing data producing method, representative values may be respectively provided every sequence tables, thus to carry out Z-sorting of the sequence tables therebetween in a stepwise manner on the basis of the representative values of respective sequence tables.

The above-mentioned Z-sorting of respective sequence tables may be recursive.

Moreover, addresses of respective sequence tables may be caused to have offset, thus to compress the sequence tables.

In the case where addresses of respective sequence tables are caused to have offset, bit lengths of respective sequence tables may be caused to be variable, to further compress the sequence tables.

In the drawing data producing apparatus featured above, sequence data indicating processing sequences of a plurality of blocks obtained by dividing a picture are written into a plurality of sequence tables allocated every objects constituting the picture with information in Z-direction in the three-dimensional coordinates of representative pixels of the respective blocks being as addresses to carry out, in a stepwise manner, Z-sorting of a plurality of sequence tables therebetween by sorting control means, thus to produce drawing data.

Moreover, Z-sorting of the sequence tables therebetween is carried out in a stepwise manner by DMA controller as the sorting control means.

In the drawing data producing method featured as above, sequence tables having, addresses, information in Z-direction in three dimensional coordinates of representative pixels of a plurality of blocks obtained by dividing a picture are allocated every objects constituting the picture to write sequence data indicating processing sequences of respective blocks every objects to carry out Z-sorting of the sequence tables therebetween in a stepwise manner, thus to produce drawing data.

In this case, stepwise Z-sorting of sequence tables therebetween is carried out on the basis of representative values of respective sequence tables.

Moreover, stepwise Z-sorting of sequence tables therebetween as mentioned above is recursively carried out.

Further, addresses of respective sequence tables are caused to have offset, thereby making it possible to compress respective sequence tables.

In addition, when addresses are caused to have offset as mentioned above, bit lengths of respective sequence tables are caused to be variable, thus making it possible to further compress respective sequence tables.

DESCRIPTION OF THE PREFERRED EMBODIMENT

A preferred embodiment of a drawing data producing apparatus and a drawing data producing method according to this invention will now be described with reference to the attached drawings.

Figure 1:
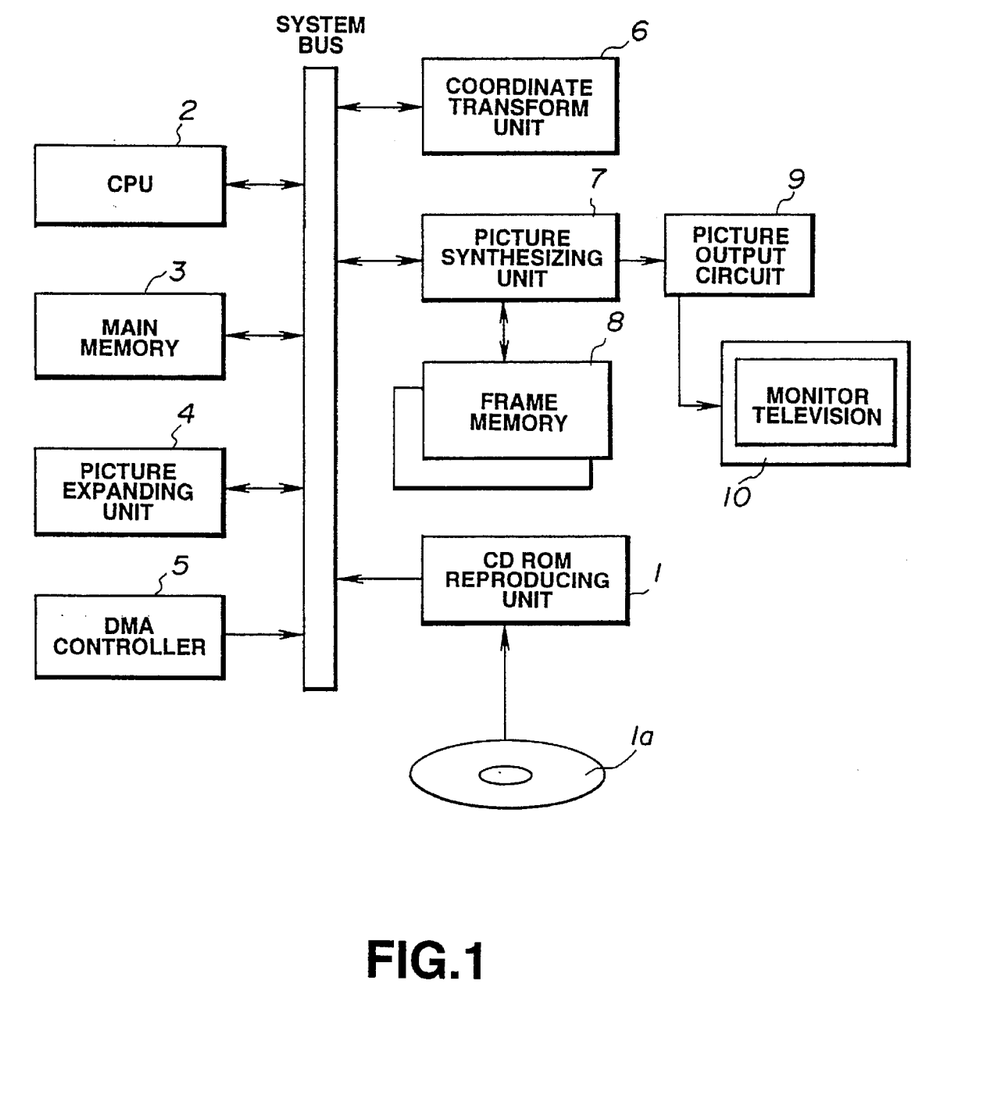
FIG. 1 is a block diagram showing outline of the configuration of a drawing data producing apparatus for carrying out a drawing data producing method according to this invention.

Drawing data producing method according to this invention is carried out by drawing data producing apparatus of a structure as shown in FIG. 1, for example.

In the drawing data producing apparatus shown in FIG. 1, this invention is applied to a television game device using optical disc (CDROM) 1a as a recording medium. This apparatus includes CDROM reproducing unit 1 for reproducing the CDROM 1a. To system bus to which the CDROM reproducing unit 1 is connected, a microcomputer (CPU)2, a main memory 3, a picture expanding unit 4, a DMA controller 5, a coordinate transform unit 8, and a picture synthesizing unit 7, etc. are connected. Further, a frame memory 8 is connected to the picture synthesizing unit 7, and a television monitor 10 is connected thereto through an output circuit 9 for picture.

This drawing data producing apparatus reproduces program data for picture processing and/or picture data from CDROM 1a by the CDROM reproducing unit 1 in accordance with operation instruction from input operation unit such as key board or mouse, etc. (not shown) connected to the CPU 2 to transfer the reproduced data to the main memory 3 to implement picture expanding processing by the picture expanding unit 4 and/or coordinate transform processing by the coordinate transform unit 6 to picture data on the main memory 3 to carry out Z-sorting through the picture synthesizing unit 7 by the DMA controller 5 by making reference to sequence table prescribing processing sequence from shallower portion toward deeper portion in block units with respect to these processed picture data to thereby sequentially produce drawing data on the frame memory 8 to read out these drawing data from the frame memory 8 to deliver them to television monitor 10 through the picture output circuit 9.

In the drawing data producing apparatus of this embodiment, a memory area for preparing sequence table is ensured on the main memory 3.

Figure 2:
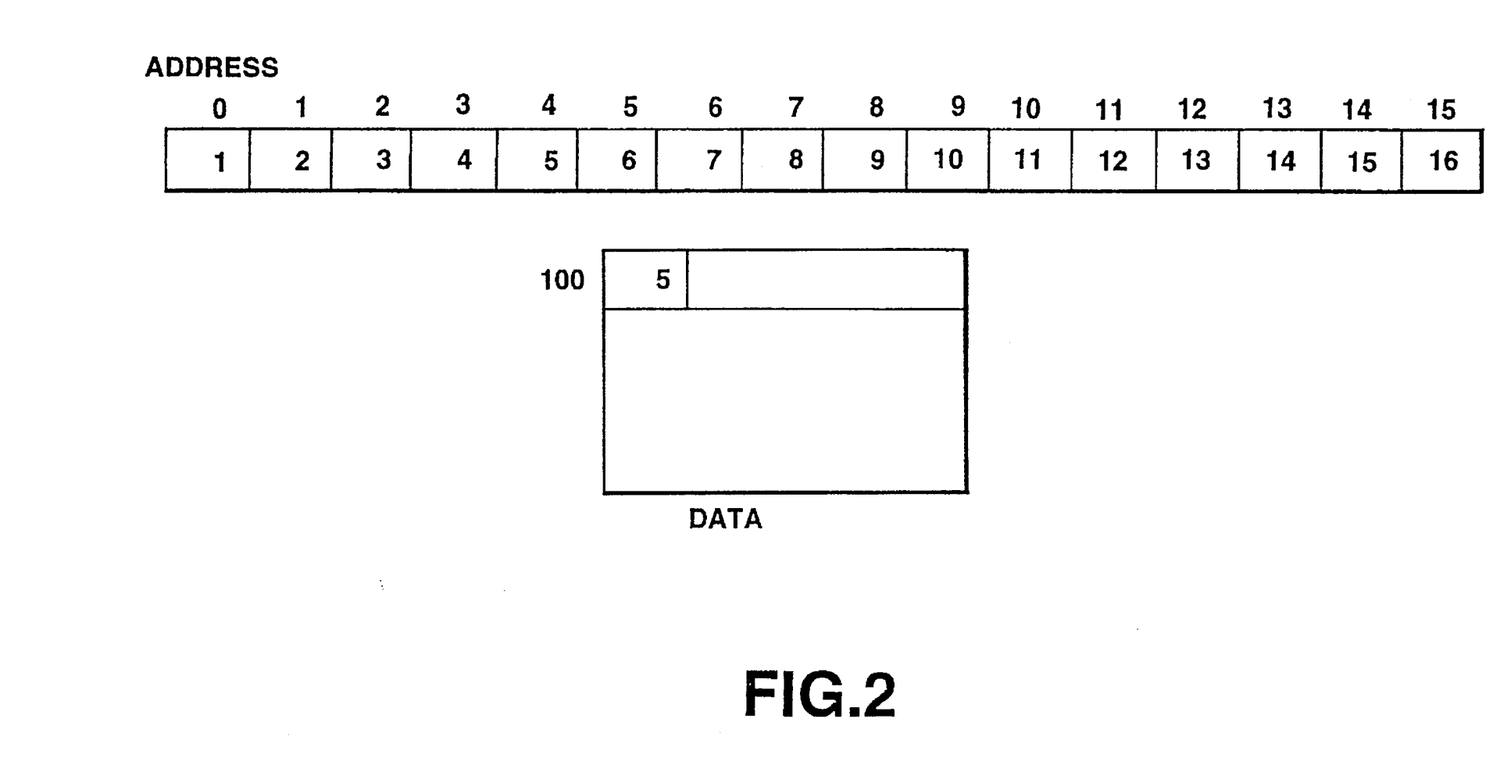
FIG. 2 is a view showing, in a model form, the content of initialized state of sequence table in the above-mentioned drawing data producing apparatus.

The sequence table is of a structure in which memory cells are taken in succession. In the initialized state, addresses (n+1) of the next memory cells are stored as respective contents of memory cells as shown in FIG. 2.

Moreover, Z as depth data is stored in block of data for carrying out Z-sorting. Value of memory cell which has offseted address of sequence table by the value of Z is changed into the leading address of data to be sorted from the address of the next memory cell. Also, in the header of the data to be sorted, a pointer area is taken. That pointer area is rewritten into value of address of the next memory cell.

Figure 3:
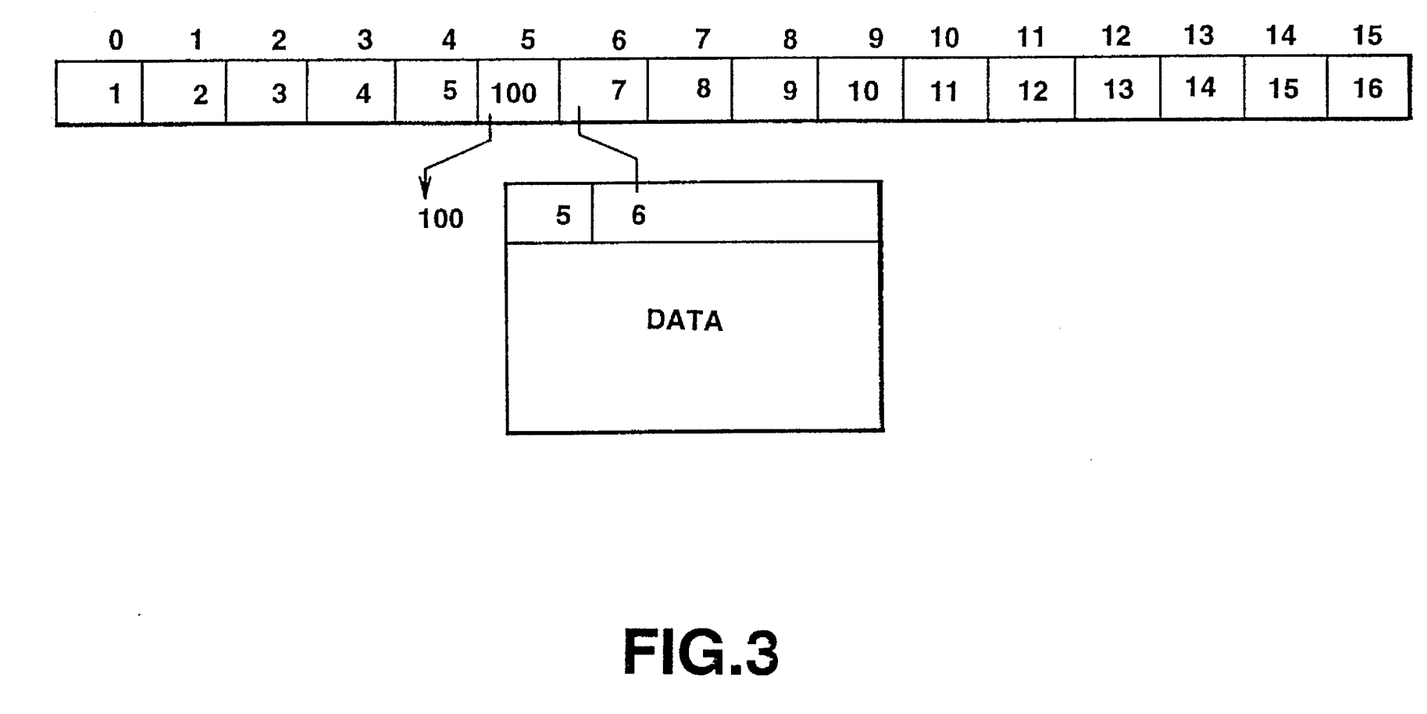
FIG. 3 is a view showing, in a model form, the content of sequence table after undergone sorting in the above-mentioned drawing data producing apparatus.

Namely, in the case where, for example, [100] is stored as Z of block of data (labeled data also in the figure) for carrying out Z-sorting in address [5] of sequence table, as sequence table after undergone Z-sorting is shown in FIG. 3, value of memory cell (address [5]) which has offseted address of sequence table by the value [100] of Z is changed into the leading address [100] of data to be sorted from address [6] of the next memory cell. In addition, pointer area of header of data (labeled data also in the figure) to be sorted is rewritten into value [6] of address of the next memory cell.

Figure 4:
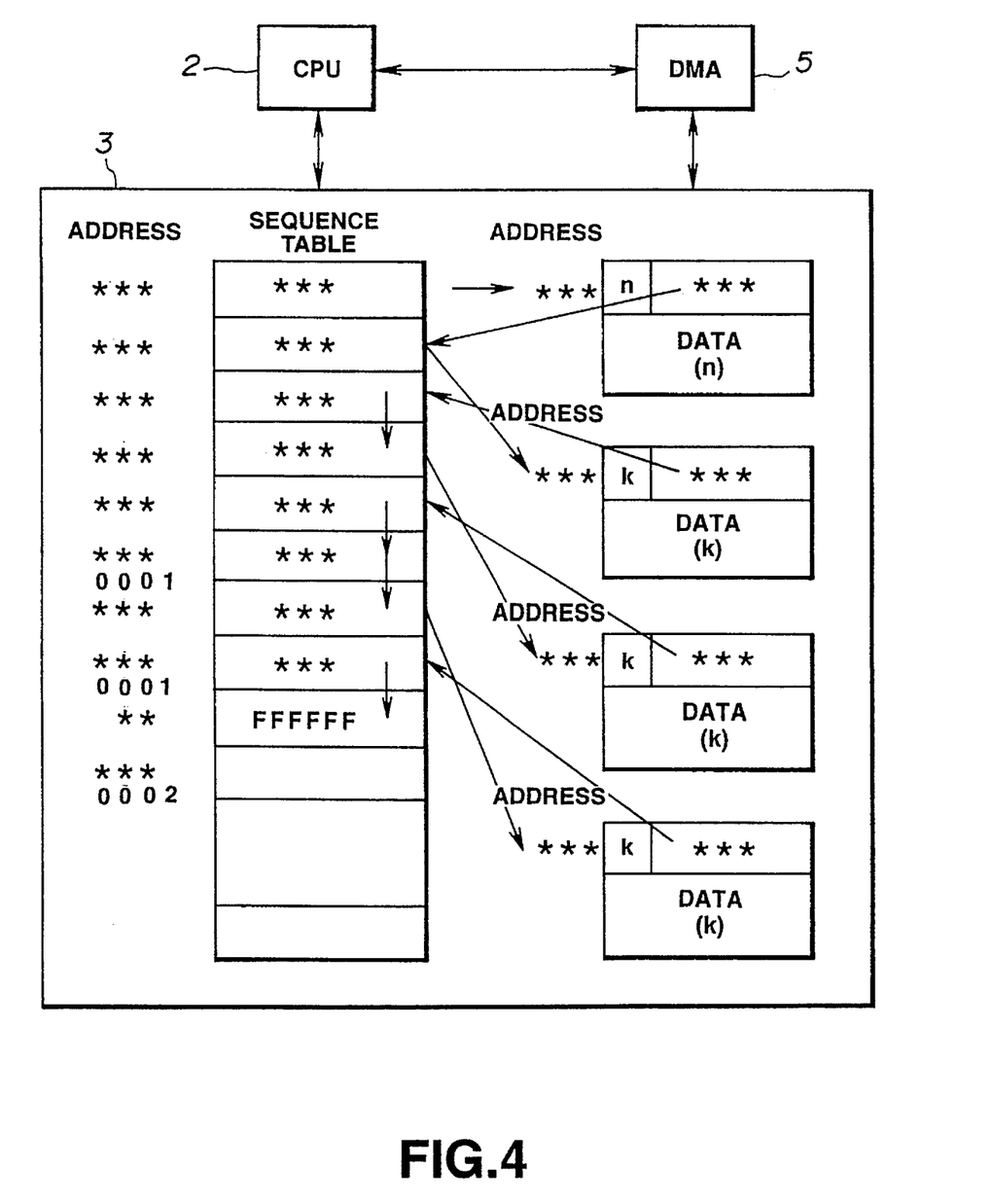
FIG. 4 is a view showing, in a model form, the content of sequence table prepared by sorting a plurality of sequence tables in the above-mentioned drawing data producing apparatus.

The drawing data producing apparatus of this embodiment includes a plurality of sequence tables allocated every objects constituting a picture, and is operative to write sequence data indicating processing sequences of a plurality of blocks obtained by dividing a picture with information in Z-direction in three-dimensional coordinates of representative pixels of the respective blocks being as addresses to carry out, in a stepwise manner, Z-sorting of a plurality of sequence tables therebetween by the DMA controller 5 on the basis of representative values of respective sequence tables to thereby prepare sequence table prescribing processing sequence from shallower portion toward deeper portion in block unit as shown in FIG. 4 to sequentially produce drawing data on the frame memory 8 by making reference to this sequence table.

Figure 5:
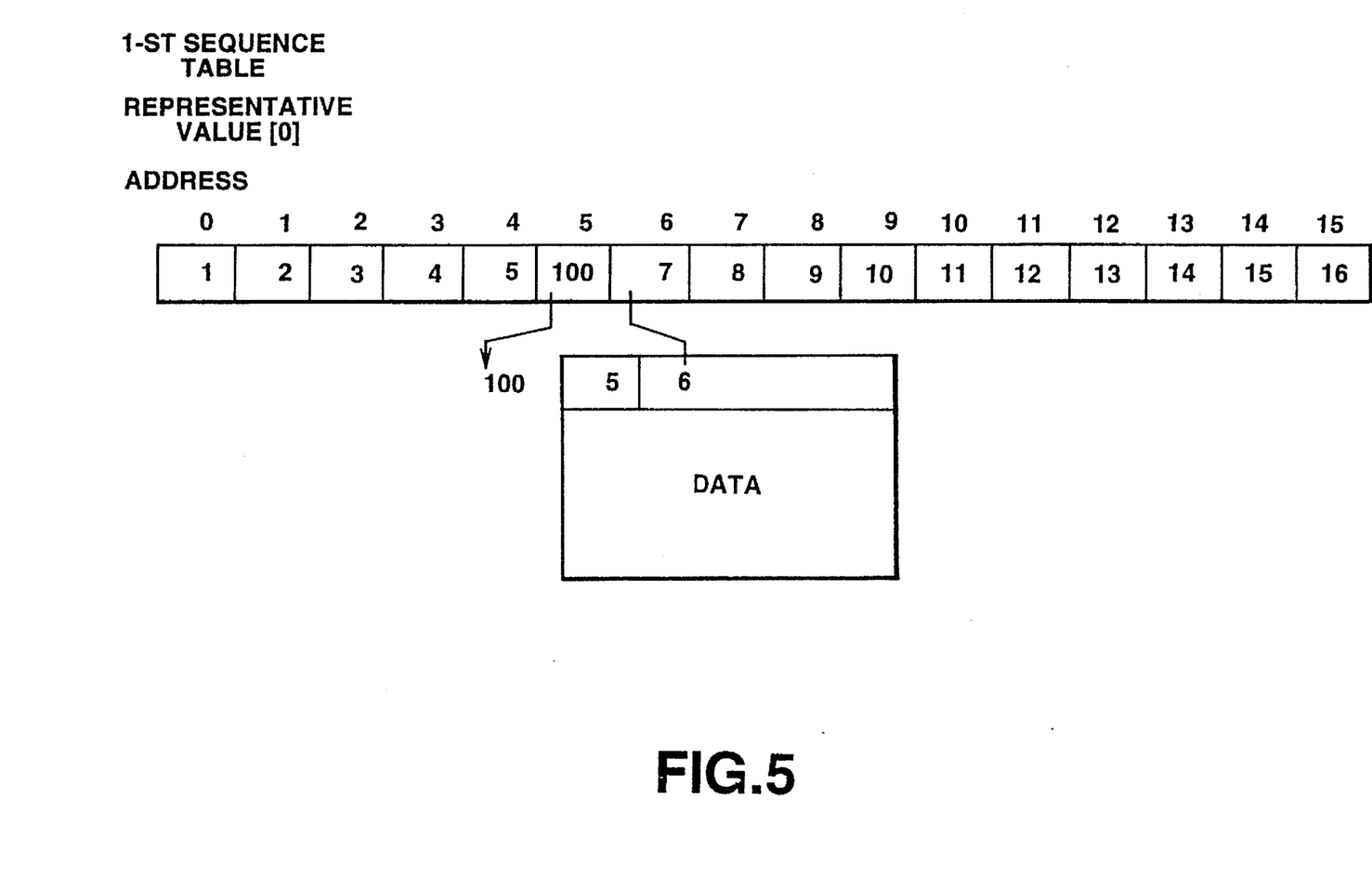
FIG. 5 is a view showing, in a model form, the content of first sequence table in the above-mentioned drawing data producing apparatus.
Figure 6:
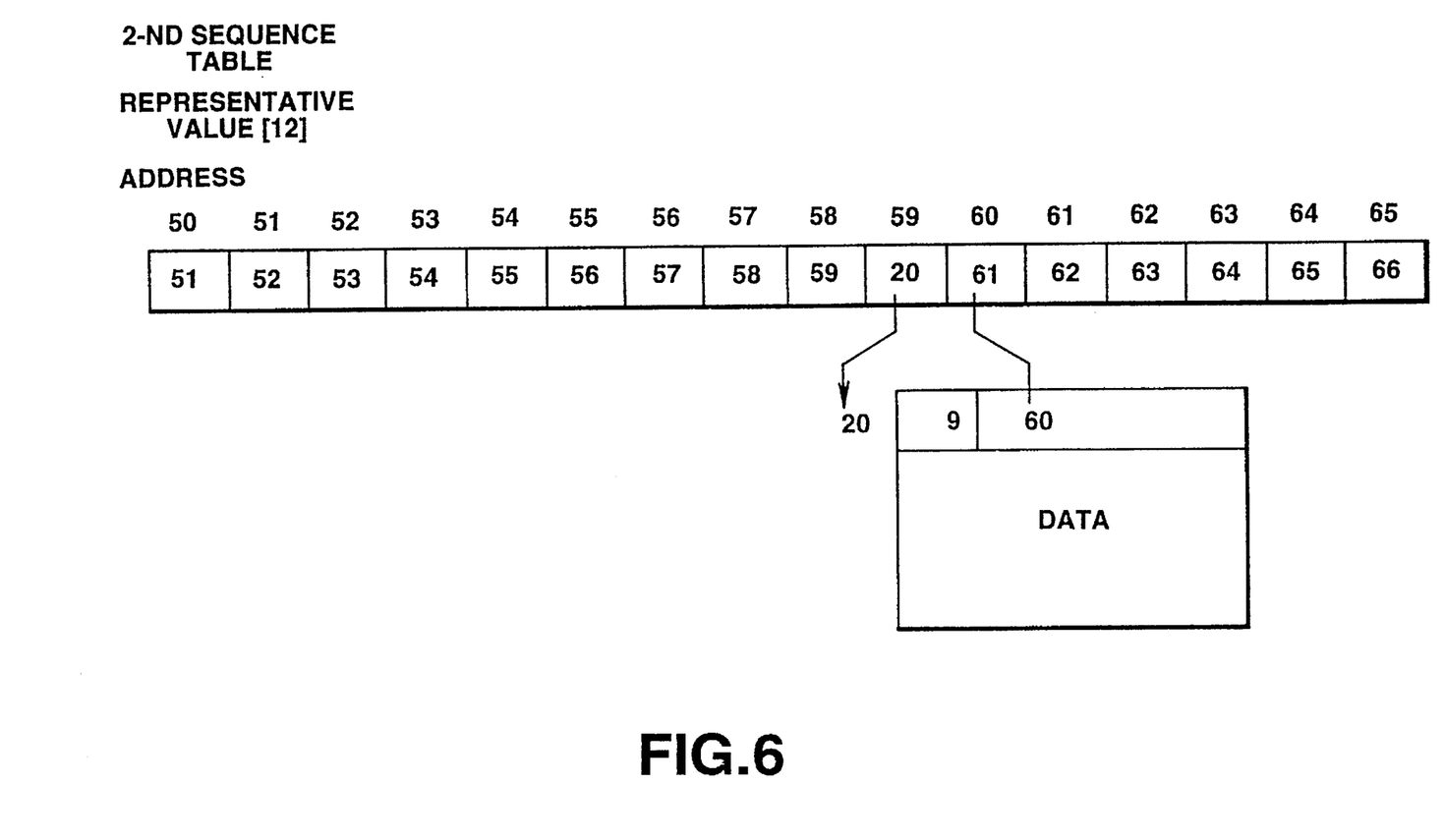
FIG. 6 is a view showing, in a model form, the content of second sequence table in the above-mentioned drawing data producing apparatus.
Figure 7:
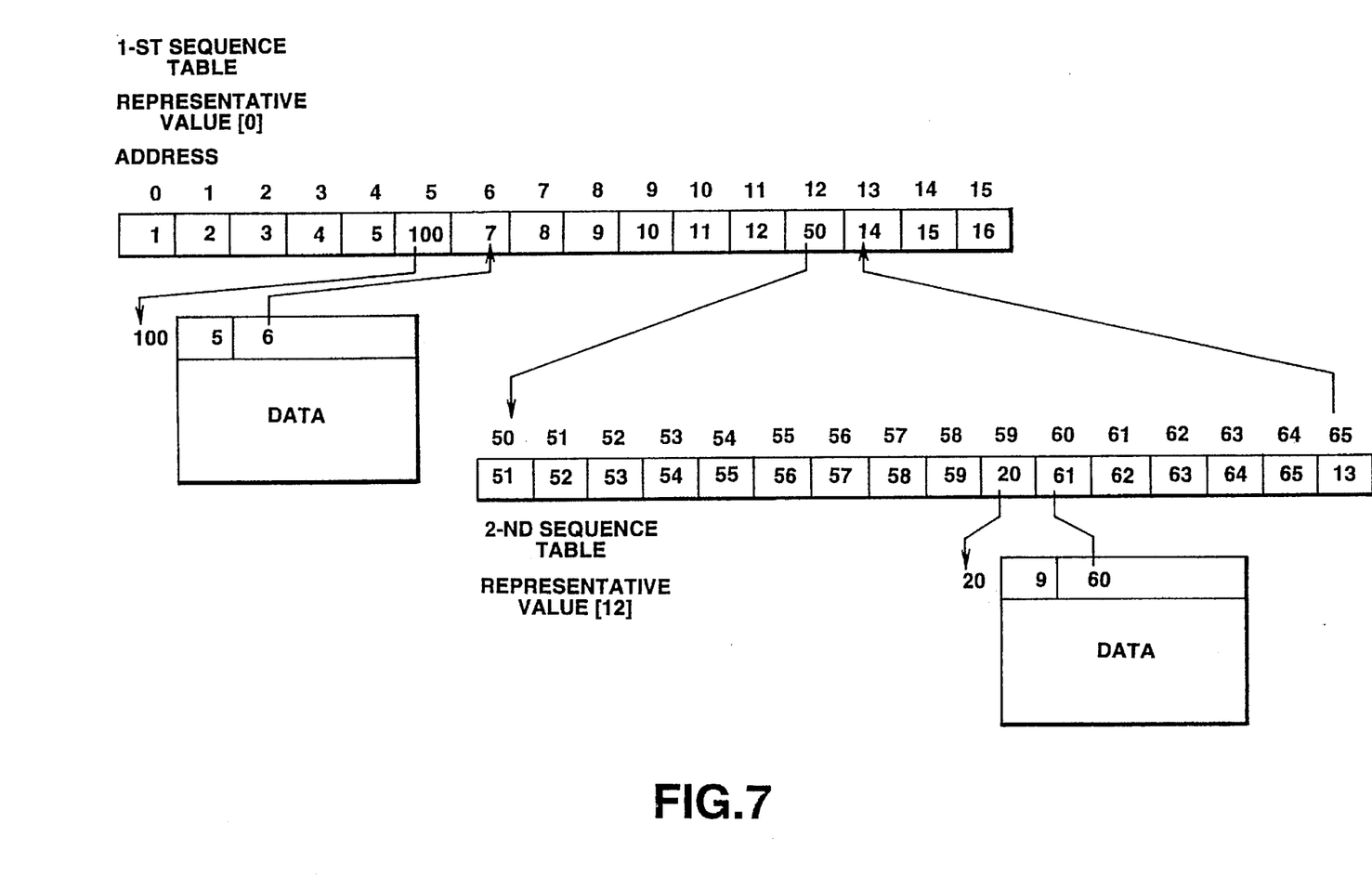
FIG. 7 is a view showing, in a model form, the content of sequence tables prepared by carrying out sorting of the second sequence table in the state allocated to the first sequence table.
Figure 8:
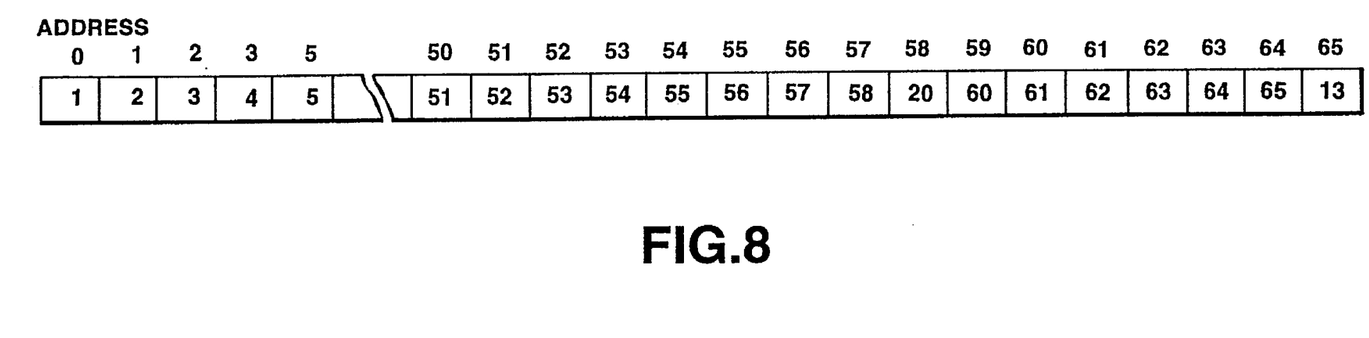
FIG. 8 is a view showing, in a model form, structure of non-compressed sequence table.
Figure 9:
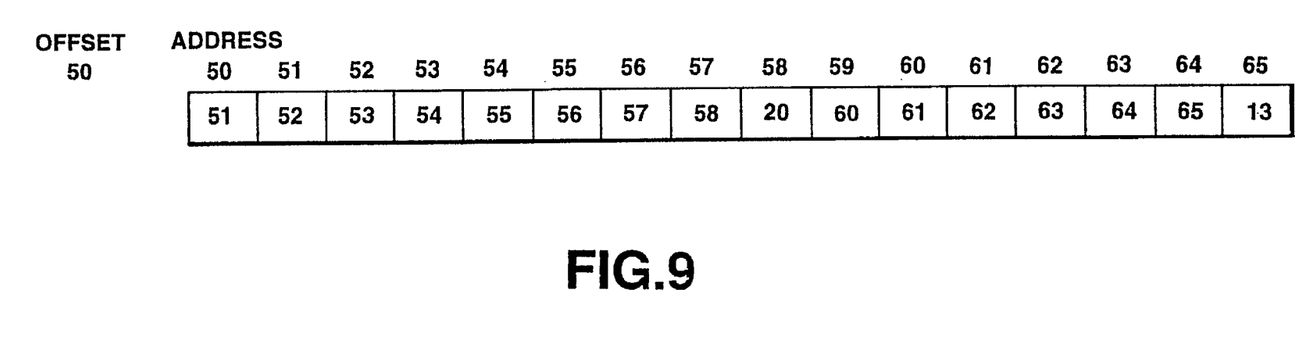
FIG. 9 is a view showing, in a model form, structure of sequence table compressed by offset.

Namely, it is now assumed, as shown in FIG. 5, for example, that first sequence table OT1 has size of [16] from address [0] and representative value of the entirety of sequence table of [0], and one data of Z value [5] and address [100] is sorted. Moreover, it is assumed, as shown in FIG. 6, for example, that second sequence table OT2 has size [16] from address [50] and representative value of the entirety of sequence table of [12], and one data of Z value [9] and address [20] is sorted. It should be noted that since Z value of data sorted in the second sequence table OT2 is HA[9], but the leading address of the second sequence table OT2 is [50], address of sequence table is allocated to [59]. When second sequence table OT2 is caused to undergo sorting in the state allocated to the first sequence table OT1, sequence table as shown in FIG. 7 is provided. Namely, since representative value of the second sequence table OT2 is [12], the leading address [50] of the second sequence table OT2 is written into memory cell of address [12] of the first sequence table OT1. In addition, address [13] of the first sequence table OT1 is written into memory cell of the last address [65] of the second sequence table OT2. In this way, the second sequence table OT2 is caused to undergo sorting in the state allocated to the first sequence table OT1.

With respect to algorithm for sorting, the system of allocating data to sequence table and the system of allocating one sequence table to the other sequence table are the same. The both systems have unity. By carrying out stepwise Z-sorting of sequence tables therebetween in a recursive manner as stated above, it is possible to simplify control of Z-sorting.

As stated above, there is employed an approach to allocate sequence table having, as addresses, information in Z-direction in three-dimensional coordinates of representative pixels of a plurality of blocks obtained by dividing a picture every objects constituting the picture to write sequence data indicating processing sequences of respective blocks every objects to carry out, in a stepwise manner, Z-sorting of sequence tables therebetween to produce drawing data, thereby making it possible to carry out Z-sorting of information of a plurality of objects physically divided in object units. Thus, also in the case where two objects are present at depths z close to each other, interference of polygon unit is excluded, thus making it possible to produce drawing data of excellent picture quality. Namely, in the case where observer observes from oblique and upper direction that, e.g., a vehicle is running on a road, the portion of the road is positioned necessarily below the vehicle. Accordingly, an approach is employed to carry out such a Z-sorting in object units to first carry out Z-sorting with respect to the road to subsequently carry out Z-sorting with respect to the vehicle thereafter to carry out Z-sorting with respect to the road and the vehicle, thereby making it possible to securely carry out Z-sorting without allowing the road and the vehicle to interfere with each other. Further, since Z-sorting of sequence tables therebetween is carried out in a stepwise manner by DMA controller 5, it is possible to securely and speedily produce drawing data of excellent picture quality by simple construction. In addition, it is possible to securely carry out stepwise Z-sorting of sequence tables therebetween on the basis of representative values of respective sequence tables.

Further, in the drawing data producing apparatus of this embodiment, it is necessary to ensure a memory area for preparing a plurality of sequence tables on the main memory 3. However, address of the sequence table is caused to have offset, thereby making it possible to compress respective sequence tables. In addition, bit length of the sequence table is caused to be variable, thereby making it possible to suppress increase in the memory capacity. Thus, it is possible to suppress increase in the memory capacity resulting from provision of a plurality of sequence tables. Namely, if the quantity of memory used is the same, it is possible to improve accuracy of sequence table.

Namely, in the case where Z value of data allocated to a certain sequence table falls within the range from [50] to [65], even if memory cells of the sequence table are ensured so as to take address [0] to address [65], [50] memory cells of address [0] to address [49] would be useless. On the contrary, when there is employed an approach in which offset is set to [50] and actual memory cells are caused to take address [50] to address [65], the number of memories becomes equal to 16. Thus, increase in memory capacity can be suppressed.

As is clear from the foregoing description, in accordance with the drawing data producing apparatus according to this invention, sequence data indicating processing sequences of a plurality of blocks obtained by dividing a picture are written into a plurality of sequence tables allocated every objects constituting the picture with information in Z-direction in three-dimensional coordinates of representative pixels of the respective blocks being as addresses to carry out, in a stepwise manner, Z-sorting of a plurality of sequence tables therebetween by sorting control means to thereby produce drawing data. Accordingly, it is possible to carry out Z-sorting of information of a plurality of objects physically divided in object units. Thus, also in the case where two objects are present at depths z close to each other, interference of polygon unit is excluded, thus making it possible to produce drawing data of excellent picture quality. Further, it becomes possible to easily carry out such processing to dispose a picture of two-dimensional space within three-dimensional space. In addition, it becomes possible to handle non-linear Z-sorting. Thus, multi-coordinate system can be introduced.

Since Z-sorting of sequence tables therebetween is carried out in stepwise manner by DMA controller, it is possible to securely and speedily produce drawing data of excellent picture quality by simple construction.

Further, in accordance with the drawing data producing method according to this invention, there is employed an approach to allocate, every objects constituting a picture, sequence tables having, as addresses, information in Z-direction in three dimensional coordinates of representative pixels of a plurality of blocks obtained by dividing the picture to write sequence data indicating processing sequences of respective blocks every objects to carry out Z-sorting of sequence tables therebetween in stepwise manner to produce drawing data. Accordingly, it is possible to carry out, in object units, Z-sorting of information of a plurality of objects physically divided. Thus, even in the case where two objects are present at depths z close to each other, interference of polygon unit is excluded, thus making it possible to produce drawing data of excellent picture quality. Further, it becomes possible to easily carry out such a processing to dispose picture of two-dimensional space within three-dimensional space. In addition, non-linear system Z-sorting can be handled. Thus, multi-coordinate system can be introduced.

Moreover, it is possible to perform stepwise Z-sorting of sequence tables therebetween on the basis of representative values of respective sequence tables.

The above-mentioned stepwise Z-sorting of sequence tables therebetween is recursively carried out, thereby making it possible to simplify control of Z-sorting.

In the above-mentioned drawing data producing method, addresses of respective sequence tables are caused to have offset, thereby making it possible to compress respective sequence tables. Thus, it is possible to suppress or minimize an increase in memory capacity which may result from the use of a plurality of sequence tables. If the quantity of the memory used is the same, it is possible to improve the accuracy of sequence table.

Finally, in the case where addresses are caused to have offset, bit lengths of respective sequence tables are caused to be variable, thereby making it possible to further compress respective sequence tables.

What is claimed is:

1. A drawing data producing apparatus comprising:

a plurality of sequence tables into which sequence data indicating processing sequences of a plurality of blocks obtained by dividing a picture are written for each object of the picture having addresses corresponding to information in a Z-direction of three dimensional coordinates of representative pixels of the respective blocks; and sorting control means for carrying out, in a stepwise manner, sorting in a depth direction (Z-sorting) of a plurality of sequence tables therebetween, so as to produce drawing data by stepwise Z-sorting of the plurality of sequence tables therebetween.

2. A drawing data producing apparatus as set forth in claim 1, wherein the sorting control means is comprised of a DMA controller.

3. A drawing data producing method comprising the steps of:

allocating sequence data indicating processing sequences of a plurality of blocks obtained by dividing a picture to a plurality of tables having as addresses information in a Z-direction of three-dimensional coordinates of representative pixels of the respective blocks for each object of the picture to write them therein to; and carrying out, in stepwise manner, Z-sorting of sequence tables therebetween so as to produce drawing data.

4. A drawing data producing method as set forth in claim 3, wherein sequence tables respectively have representative values, thus to carry out, in a stepwise manner, Z-sorting of the sequence tables therebetween on the basis of the representative values of the respective sequence tables.

5. A drawing data producing method as set forth in claim 3, wherein Z-sorting of respective sequence tables is recursive.

6. A drawing data producing method as set forth in claim 3, further comprising the step of causing the addresses of respective sequence tables to have an offset so as to compress the sequence tables.

7. A drawing data producing method as set forth in claim 6, further comprising the step of causing bit lengths of respective sequence tables to be variable so as to compress the sequence tables.

* * * * *